United States Patent Office 2,880,063
Patented Mar. 31, 1959

2,880,063

PROCESS FOR THE PREPARATION OF PHOSPHORIC ACID

Abraham Baniel and Ruth Blumberg, Haifa, Israel, assignors to Makhtsavei Israel, Tel Aviv, Israel, a corporation of Israel No Drawing. Application April 1, 1957
Serial No. 649,649

Claims priority, application Israel June 25, 1956

7 Claims. (Cl. 23—165)

The invention concerns the preparation of phosphoric acid from tricalcium phosphate of any kind, including rock phosphate and even such minerals or ores wherein the tricalcium phosphate is associated with other compounds, e.g. with calcium fluoride.

The invention has the object to provide a process allowing the recovery of virtually all the $P_2O_5$ of the starting material in the form of aqueous $H_3PO_4$ by the decomposition of tricalcium phosphate with aqueous hydrochloric acid.

As compared with the use of sulfuric acid for the decomposition of tricalcium phosphate, the use of hydrochloric acid for this purpose has the advantage of enabling the utilization of surplus or waste hydrochloric acid for which it is sometimes and at some places difficult to find an outlet. Various processes have already been suggested for the decomposition of tricalcium phosphate with hydrochloric acid. Some of them lead to the formation of commercially unutilizable mixtures of calcium phosphates, calcium chloride and phosphoric acid. Others produce mixed salts known as calcium chlorophosphates. However, no known method has achieved the complete decomposition of calcium triphosphate with aqueous hydrochloric acid and the recovery of the phosphoric acid as such, for the reason that the phosphoric acid could so far not be separated from the aqueous reaction system.

It has also been proposed to decompose tricalcium phosphate in a substantially anhydrous medium with sulfuric or hydrochloric acid and to extract the liberated phosphoric acid with a solvent such as ether or n-amyl alcohol. This process is commercially unusable as the extraction of phosphoric acid from the stiff sludge obtained by the nearly anhydrous decomposition of the tricalcium phosphate causes inadmissible losses of both solvent and phosphoric acid. This method is also most inconvenient from the engineering and process points of view as it entails difficult separating operations.

The invention is based on the new observation that free phosphoric acid can be distributed between two phases constituted, respectively, by an aqueous liquid and a suitable selected solvent, if the aqueous phase contains a substantial amount of calcium chloride. In this case a substantial proportion of the phosphoric acid is taken up by the solvent phase. Some water accompanies the phosphoric acid into the solvent phase, but only negligible amounts of solvent go into the aqueous phase.

This observation is rather surprising in view of the known behaviour of phosphoric acid towards solvents in which it is soluble and which are normally not completely miscible with water. Concentrated phosphoric acid is very soluble in, or even completely miscible with, many organic solvents. For example, phosphoric acid containing 50% or more of $H_3PO_4$ is completely miscible with n-butyl alcohol. At lower concentrations the solubility decreases sharply so that, for example, hardly any $H_3PO_4$ can be extracted into a butyl alcohol from a 20% aqueous solution of phosphoric acid. On the other hand the solubility of water in solvents with which it is not ordinarily miscible, is increased by the presence of phosphoric acid, the more so the higher the phosphoric acid concentration in the aqueous phase. From these known data it could not be foreseen or inferred that the partition coefficient of $H_3PO_4$ between certain solvents and an aqueous phase which may even be rather dilute as regards the phosphoric acid, would be materially influenced by the presence of calcium chloride in the aqueous phase.

The invention consists in a process for the preparation of aqueous phosphoric acid, wherein tricalcium phosphate is decomposed with hydrochloric acid in an aqueous reaction system, preferably with an excess of HCl over the equivalent of the phosphoric acid content of the phosphate; free phosphoric acid is extracted from the aqueous reaction mixture into a solvent capable of dissolving concentrated phosphoric acid but having limited miscibility with water both by itself in the absence of phosphoric acid, and in the presence of both phosphoric acid and calcium chloride; the solvent phase is separated from the aqueous phase; and concentrated aqueous phosphoric acid is recovered from the solvent phase.

Solvents usuable with particular advantage for the purpose of the invention are lower aliphatic alcohols having three or more carbon atoms in the molecule, especially the commercially readily available butanols, pentanols and mixtures thereof, also ketones and other polar solvents.

The extraction may be carried out in batches, in which case it will be repeated until the desired or commercially advantageous degree of exhaustion of phosphoric acid is reached. Or else the process may be carried out in a continuous operation, with extraction in countercurrent, in cascade, or in any other suitable continuous manner.

It is one of the advantages of the process according to the invention that the phase separation can be carried out without filtration. In coventional processes for the preparation of phosphoric acid from rock phosphates by decomposition with sulfuric acid, the separation of the phosphoric acid from undissolved rock matter and the precipitated calcium sulfate necessitates costly filtration. If the rock phosphate is dissolved in hydrochloric acid the undissolved matter forms generally a suspension which settles slowly and is difficult to filter. In the process according to the invention, this very stability of the suspension of the undissolved matter makes it possible to treat the suspension as a liquid phase and to subject it directly to the solvent extraction. The phase separation is rapid and sharp, and hardly any solid matter passes into the solvent phase; to the extent that it does, it can easily be removed by settling and decantation.

Solvents capable of dissolving phosphoric acid are generally also solvents for hydrochloric acid and for monocalcium phosphate. Therefore, if the decomposition is effected with an excess of HCl, the excess is also extracted into the solvent. If the process is carried out with less HCl than the equivalent of $P_2O_5$ in the phosphate, monocalcium phosphate forms, possibly besides free phosphoric acid, and is also extracted into the solvent. In that case the solvent extract may be treated with aqueous hydrochloric acid, whereby the monocalcium phosphate is decomposed and the calcium chloride thereby formed is extracted back into the aqueous phase existing during this auxiliary operation. However, it is generally advisable to operate from the outset with an excess of HCl and thus to avoid the passage of calcium salt into the solvent phase.

The phosphoric acid can in different ways be recovered from the solvent phase and separated from the extracted excess HCl.

By one method the solvent extract is mixed with a second solvent, e.g. benzene or another hydrocarbon solvent, or generally a solvent miscible with the first solvent but not being a solvent for aqueous phosphoric acid. By this operation a new two-phase system is created in which the bottom phase consists of a concentrated aqueous acid, containing virtually the whole of the phosphoric and hydrochloric acids originally extracted from the reaction mixture into the first solvent, while the top phase is a mixture of the two solvents. The two phases can readily be separated. From the aqueous phase the hydrochloric acid can be removed by distillation or stripping with hot air or another gas. The solvent mixture may be subjected to fractional distillation, and the two solvents can separately be re-cycled.

By another method the original solvent extracted may directly be subjected to thermal treatment such as distillation or stripping, whereby concentrated aqueous phosphoric acid is obtained as a residue while the expelled solvent and hydrochloric acid can be collected separately.

The extraction of $P_2O_5$ from tricalcium phosphate by the process according to the invention is very efficient and recoveries of 96–98% of the total $P_2O_5$ originally present may be achieved in a few stages, if the extraction is carried out in batches or in cascade, and during a relatively short period of contact if the extraction is performed in countercurrent. By a judicious observation of optimal process conditions, the losses of free HCl—apart from the amount consumed by conversion into calcium chloride—can be made negligible.

The phosphoric acid is at once obtained in a state of much greater purity than it is by conventional processes. In particular it is free from calcium and other cations present in the rock phosphate as impurities. Only a few heavy metals such as iron, chromium and uranium, generally present in traces in the rock phosphate, are to some extent coextracted with the phosphoric acid. Where the phosphate contains fluoride, hydrogen fluoride is extracted into the solvent together with the excess HCl and accompanies the latter when it is being separated from the phosphoric acid, but it may be expelled previously.

The invention is illustrated by the following examples to which it is not limited.

*Example 1*

267 grs. of ground phosphate rock mined at Oron (Israel) are decomposed by aqueous HCl containing 235 grs. of HCl and 1000 grs. of $H_2O$. The rock contains 28.5% $P_2O_5$ in the form of fluorapatite, the balance being mainly $CaCO_3$. Most of the rock dissolves rapidly with the evolution of heat. The residue remains as a finely suspended material which does not interfere with subsequent liquid-liquid extraction operations and need not be filtered.

The reaction mixture is now extracted counter-currently with a solution of 42 grs. of HCl and 98 grs. of $H_2O$ in 2000 grs. of isoamyl alcohol. Most of the phosphoric acid is extracted at this stage along with part of the free HCl (41 grs.) present in the reaction mixture. The extract phase is treated for the recovery and separation of HCl and $H_3PO_4$ as described below. The extracted aqueous phase is extracted again countercurrently with 2000 grs. of isoamyl alcohol whereby most of the remaining HCl and $H_3PO_4$ are extracted. 5 grs. of HCl and 4 to 5 grs. of $H_3PO_4$ remain in the aqueous phase and are rejected with the $CaCl_2$ and the insolubles. The isoamyl alcohol extract is made up with 30% HCl to 42 grs. of HCl (100%) and used in the first extraction step.

The first solvent extract is mixed with 100 grs. of benzene. An aqueous phase containing most of the acids settles out and is separated. The mixed solvent is washed twice with 5 grs. of $H_2O$ and the washings added to the first aqueous phase. The mixed acids are separated by distillation whereby 170 grs. of HCl of 30% are obtained as distillate. The residue amounts to 120 grs. and consists of:

| | Grs. |
|---|---|
| $H_3PO_4$ | 100 |
| Ca | 4 |
| $H_2O$ | 15 |
| Other constituents | 1 |
| | 120 |

The isoamyl alcohol and benzene are separated by fractional distillation and returned to the process.

The overall balance of the process is, therefore, as follows:

| | Grs. |
|---|---|
| 28.5% phosphate rock | 267 |
| HCl consumed by reaction | 194 |
| HCl in excess in reaction mixture | 41 |
| Total | 235 |

HCl in first extract:
| | |
|---|---|
| Brought in with acid isoamyl alcohol | 42 |
| Extracted from water | 9 |
| | 51 |

*Example 2*

The starting material is 231 grs. of North African phosphate containing 33% of $P_2O_5$. The process is performed as described in Example 1, except that the quantity of HCl required for the decomposition of the phosphate is 209 grs. instead of 235 grs.

The result is substantially the same as in Example 1.

*Example 3*

The process is performed as described in Example 1, but n-butanol replaces the isoamyl alcohol as the solvent for the extraction. The amount of n-butanol required is 1200 grs. at every stage, instead of 2000 grs. of isoamyl alcohol.

With this solvent, slightly more Ca is extracted than with isoamyl alcohol. Accordingly, the product contains about 14 grs. of Ca instead of 4 grs. as in Example 1. This product, though being slightly less pure than that obtained in accordance with Example 1, is still suitable for the manufacture of the so-called "triple" superphosphate.

However, the calcium content of the final product can be greatly reduced if the first solvent extract, before being submitted to the acid recovery operation, is extracted with aqueous HCl. This acid extract can be added to the acid used for decomposing the crude phosphate.

The Ca-content of the phosphoric acid obtained as the end product is thus reduced to below 2%.

*Example 4*

The process is performed as described in any of Examples 1, 2 or 3, with the difference that the crude rock phosphate is calcined before being decomposed with hydrochloric acid.

This results in a product of lighter colour.

If the crude phosphate contains fluoride, HF may be removed from the acid aqueous decomposition mixture, prior to the solvent extraction, by passing a stream of air through this mixture for a sufficient length of time to ensure the desired degree of removal of HF.

*Example 5*

The process is carried out as described in any of the preceding examples, up to and excluding the operation of submitting to distillation the aqueous mixture of phosphoric and hydrochloric acids obtained by admixing benzene to the solvent extract.

Instead of the distillation described in Example 1, the aqueous acid mixture is separated into its components by passing through it a stream of air at about 80 to 90° C. By this operation, HCl and water are evaporated and concentrated aqueous phosphoric acid remains as a residue.

We claim:

1. A process for the preparation of aqueous phosphoric acid, comprising mixing a comminuted tricalcium phosphate containing material with aqueous hydrochloric acid in an amount which is in excess over the equivalent of the phosphoric acid content of the tricalcium phosphate containing material, in order to form an aqueous solution containing calcium chloride, hydrochloric acid and phosphoric acid, the latter being present in said aqueous solution in a concentration equivalent to not more than 125 grams, of $P_2O_5$ per liter; extracting phosphoric acid from said aqueous solution with a solvent selected from the group consisting of lower aliphatic alcohols and ketones of limited mutual miscibility with water, said solvent containing in solution water and HCl, the total quantity by weight of HCl in said solvent and said aqueous solution being of the order of the weigth of phosphoric acid in the solution to be extracted; the total volume of the solvent used in the extraction being at least equal to the volume of said aqueous solution; separating the solvent extract thus obtained from the aqueous solution, and recovering concentrated aqueous phosphoric acid from the solvent extract.

2. A process as claimed in claim 1, wherein the extraction of the aqueous solution is carried out as a discontinuous operation and repeated until the desired degree of exhaustion of phosphoric acid in said solution is reached.

3. A process as claimed in claim 1, wherein the extraction of the aqueous solution is carried out as a continuous operation.

4. A process as claimed in claim 1, wherein the solvent extract separated from the aqueous solution is mixed with a further solvent which is miscible with the solvent used for extraction, and is not miscible with water and not a solvent for aqueous phosphoric acid, in order to cause separation of the solvent extract into an aqueous acid bottom layer and a top layer consisting of a mixture of the extracting solvent and said further solvent and said bottom layer is separated from said top layer.

5. A process as claimed in claim 4, wherein the separated bottom layer is subjected to a heat treatment in order to remove HCl therefrom.

6. A process as claimed in claim 4, wherein the separated top layer is subjected to fractional distillation.

7. A process as claimed in claim 1, wherein the solvent extract separated from the aqueous solution, is subjected to a heat treatment in order to evaporate the solvent and any HCl contained in the solvent extract and obtain aqueous phosphoric acid as the residue.

References Cited in the file of this patent

UNITED STATES PATENTS

| | | |
|---|---|---|
| 1,857,470 | Milligan et al. | May 10, 1932 |
| 1,981,145 | Keller | Nov. 20, 1934 |
| 2,493,915 | Cross | Jan. 10, 1950 |